(12) United States Patent
Yang

(10) Patent No.: US 10,459,122 B2
(45) Date of Patent: Oct. 29, 2019

(54) MANUFACTURING METHOD OF ANTI GLARE LAYER AND DISPLAY PANEL

(71) Applicant: Wuhan China Star Optoelectronics Technology Co., Ltd., Wuhan, Hubei (CN)

(72) Inventor: Yong Yang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 18 days.

(21) Appl. No.: 15/558,164

(22) PCT Filed: Aug. 22, 2017

(86) PCT No.: PCT/CN2017/098449
§ 371 (c)(1),
(2) Date: Sep. 13, 2017

(87) PCT Pub. No.: WO2019/015009
PCT Pub. Date: Jan. 24, 2019

(65) Prior Publication Data
US 2019/0025468 A1    Jan. 24, 2019

(30) Foreign Application Priority Data

Jul. 20, 2017    (CN) .......................... 2017 1 0597936

(51) Int. Cl.
*G02B 1/111*    (2015.01)
*G02B 5/02*    (2006.01)
(Continued)

(52) U.S. Cl.
CPC .............. *G02B 1/111* (2013.01); *C03B 25/02* (2013.01); *C03C 17/32* (2013.01); *G02B 5/0226* (2013.01);
(Continued)

(58) Field of Classification Search
CPC ........ G02B 1/11; G03B 25/02; G03C 17/009; G03C 17/32; C03C 2217/73; C03C 2218/112; C03C 2218/32
(Continued)

(56) References Cited

U.S. PATENT DOCUMENTS

| 8,081,385 B2 | 12/2011 | Matsumura |
| 8,163,372 B2 | 4/2012 | Furui |

(Continued)

FOREIGN PATENT DOCUMENTS

| CN | 101118292 A | 2/2008 |
| CN | 103038676 A | 4/2013 |

(Continued)

*Primary Examiner* — Gerard Higgins
(74) *Attorney, Agent, or Firm* — Andrew C. Cheng

(57) ABSTRACT

Disclosed are a manufacturing method of an anti glare layer and a display panel. The method comprises: preparing a spray solution comprising sprayed particles, each having a shell structure; spraying the spray solution uniformly onto the glass substrate by a spraying device to form an arrangement structure on the glass substrate; spraying an acidic liquid on the arrangement structure to remove the shell structures of the sprayed particles each having the shell structure to form gaps among the spray particles; implementing an annealing treatment to the sprayed particles to form the anti glare layer. Thus, the light diffraction effect can be reduce or even eliminated to improve the picture quality of the display for promoting the comfort of the user viewing.

16 Claims, 4 Drawing Sheets

(51) Int. Cl.
*C03B 25/02* (2006.01)
*C03C 17/32* (2006.01)

(52) U.S. Cl.
CPC ........ *G02B 5/0268* (2013.01); *C03C 2217/42* (2013.01); *C03C 2217/732* (2013.01); *C03C 2218/112* (2013.01); *C03C 2218/32* (2013.01); *Y10T 428/24405* (2015.01); *Y10T 428/24802* (2015.01)

(58) Field of Classification Search
USPC .................. 428/144, 206, 432; 359/599, 601
See application file for complete search history.

(56) References Cited

U.S. PATENT DOCUMENTS

| | | |
|---|---|---|
| 9,166,205 B2 | 10/2015 | Jo et al. |
| 9,507,057 B2 | 11/2016 | Furui |
| 2011/0143029 A1 | 6/2011 | Chen et al. |
| 2012/0134024 A1 | 5/2012 | Lander et al. |
| 2012/0257281 A1* | 10/2012 | Takagi ............. B29D 11/00798 359/599 |
| 2013/0250414 A1* | 9/2013 | Eguchi ................ G02B 5/0242 359/488.01 |
| 2016/0355689 A1 | 12/2016 | Lander et al. |

FOREIGN PATENT DOCUMENTS

| | | |
|---|---|---|
| CN | 104230178 A | 12/2014 |
| CN | 106574992 A | 4/2017 |
| DE | 102006060722 A1 | 4/2008 |
| JP | H0588001 A | 4/1993 |

\* cited by examiner

MANUFACTURING METHOD OF ANTI GLARE LAYER AND DISPLAY PANEL

FIELD OF THE INVENTION

The present invention relates to a display field, and more particularly to a manufacturing method of an anti glare layer and a display panel.

BACKGROUND OF THE INVENTION

The anti glare treatment is usually implemented on the surface of the glass cover sheet to reduce glare on the surface of the glass cover sheet, thereby enhancing the readability of the display panel. The common anti glare surface treatment is to spray coated particles to the glass cover sheet for implementing the surface treatment.

However, since gaps or holes must exist among the sprayed particles, the light diffraction phenomenon is liable to generate on the surface of the glass cover sheet when the gaps or the holes satisfy certain conditions so that the dark pixels around the bright pixel in the display panel show brightness changes. Such brightness changes will cause the displayed image to be blurred or the decrease of the screen brightness, thus affecting the comfort of the user viewing.

SUMMARY OF THE INVENTION

An objective of the present invention is to provide a manufacturing method of an anti glare layer and a display panel, which can solve the problem that a surface of a glass cover sheet is liable to generate a light diffraction phenomenon in an anti glare surface treatment of prior art, thereby affecting the comfort of the user viewing, to reduce or even to eliminate the light diffraction effect and to improve the picture quality of the display for promoting the comfort of the user viewing.

For solving the aforesaid technical issue, another technical solution employed by the present invention is: a display panel, comprising a glass substrate and a display device, wherein an anti glare layer is provided on the glass substrate and a manufacturing method of the anti glare layer comprises steps of: preparing a spray solution comprising sprayed particles, each having a shell structure; spraying the spray solution uniformly onto the glass substrate by a spraying device to form an arrangement structure on the glass substrate; spraying an acidic liquid on the array structure to remove the shell structures of the sprayed particles each having the shell structure to form gaps among the sprayed particles, wherein the acidic liquid is an inorganic acidic liquid and the gaps are in a range of 1 μm to 20 μm; implementing an annealing treatment to the sprayed particles to form the anti glare layer.

For solving the aforesaid technical issue, a technical solution employed by the present invention is: a manufacturing method of an anti glare layer, comprises steps of: preparing a spray solution comprising sprayed particles, each having a shell structure; spraying the spray solution uniformly onto the glass substrate by a spraying device to form an array structure on the glass substrate; spraying an acidic liquid on the array structure to remove the shell structures of the sprayed particles each having the shell structure to form gaps among the sprayed particles; implementing an annealing treatment to the sprayed particles to form the anti glare layer.

For solving the aforesaid technical issue, another technical solution employed by the present invention is: a display panel, comprising a glass substrate and a display device, wherein an anti glare layer is provided on the glass substrate and a manufacturing method of the anti glare layer comprises steps of: preparing a spray solution comprising sprayed particles, each having a shell structure; spraying the spray solution uniformly onto the glass substrate by a spraying device to form an array structure on the glass substrate; spraying an acidic liquid on the arrangement structure to remove the shell structures of the sprayed particles each having the shell structure to form gaps among the sprayed particles; implementing an annealing treatment to the sprayed particles to form the anti glare layer.

The benefits of the present invention are: in the manufacturing method of the anti glare layer and a display panel, by preparing the sprayed particles each having a shell structure and then processing the sprayed particles having the shell structure to form the gaps among the sprayed particles, the light diffraction effect can be reduce or even eliminated to improve the picture quality of the display for promoting the comfort of the user viewing.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
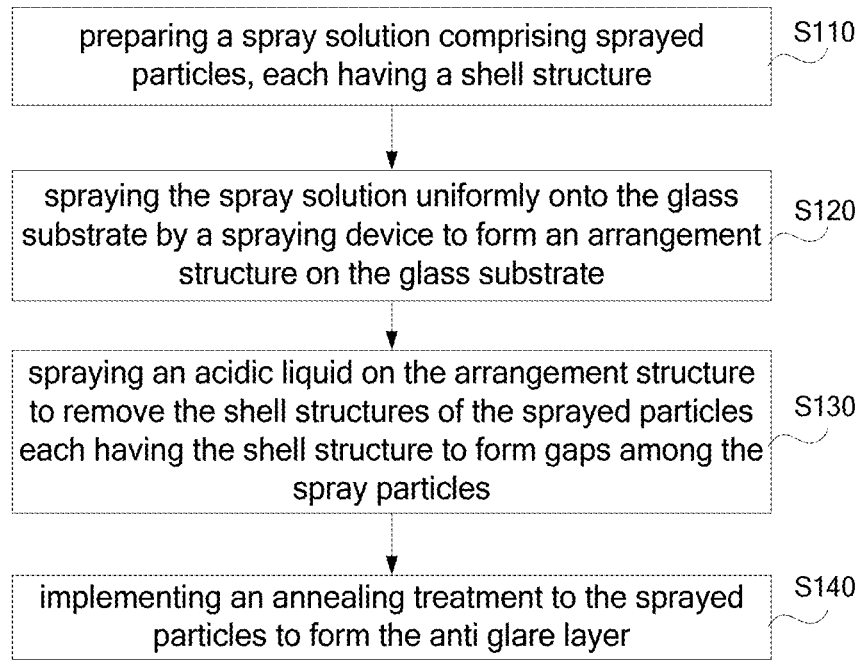
FIG. 1 is a flowchart of one embodiment of the manufacturing method of the anti glare layer according to the present invention.
Figure 2:
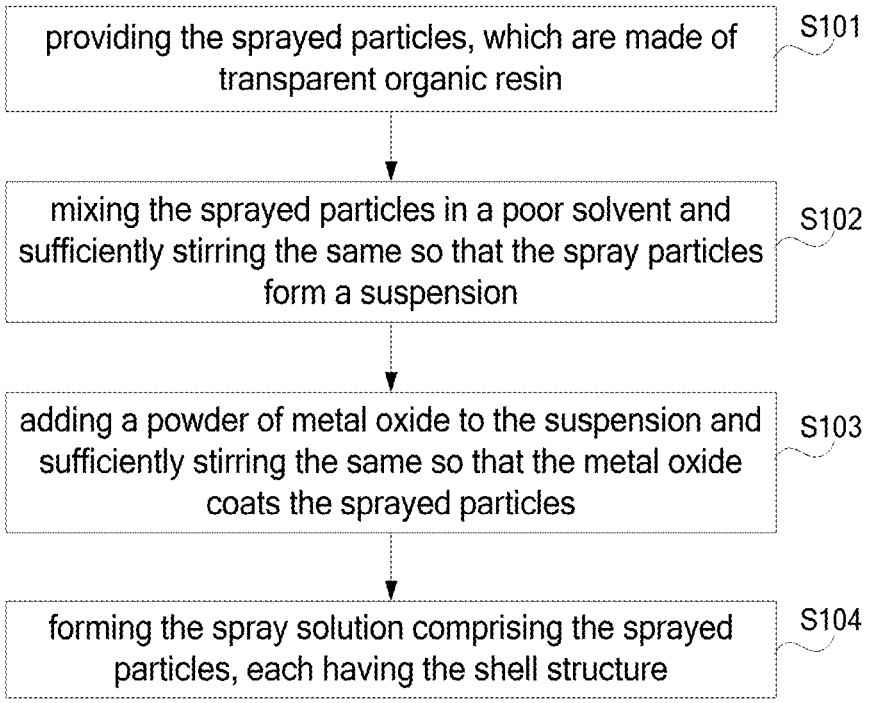
FIG. 2 is a flowchart of Step S110 of one embodiment according to the present invention.

Please refer to FIG. 1 and FIG. 2. FIG. 1 is a flowchart of one embodiment of the manufacturing method of the anti glare layer according to the present invention. FIG. 2 is a flowchart of Step S110 of one embodiment according to the present invention. Significantly, under the circumstance that the same result can be substantially derived, the method of the present invention is not limited to the flow order shown in FIG. 1. As shown in FIG. 1, the method comprises steps of:

Step S110, preparing a spray solution comprising sprayed particles, each having a shell structure.

Generally, the anti glare surface treatment is to spray coated particles to a glass cover sheet for implementing the surface treatment. Since gaps or holes must exist among the sprayed particles, the light diffraction is liable to generate on the surface of the glass cover sheet when the gaps or the holes satisfy certain conditions. Therefore, in this embodiment, the range of the gaps or the holes of the sprayed particles is controlled by preparing the spray solution to reduce or even to eliminate the light diffraction effect. The specific manufacturing method is described below.

Step S120: spraying the spray solution uniformly onto the glass substrate by a spraying device to form an arrangement structure on the glass substrate.

The prepared spray solution is filled in the spraying device and pressure or centrifugal force is utilized to spray the spray solution uniformly onto the glass substrate by the spraying device. The arrangement structure is formed on the glass substrate after the poor solvent of the spray solution is volatilized. The arrangement structure refers to that one sprayed particle is next to one spray particle.

Step S130: spraying an acidic liquid on the arrangement structure to remove the shell structures of the sprayed particles each having the shell structure to form gaps among the spray particles.

The acidic liquid is sprayed on the formed arrangement structure. The acidic liquid reacts with the shell structures, thus removing the shell structures to form the gaps among the sprayed particles. It is also an option to form holes among the sprayed particles and the present invention is not specifically limited thereto.

Step S140: implementing an annealing treatment to the sprayed particles to form the anti glare layer.

At last, annealing treatment is implemented to enhance the binding force between the sprayed particles and the glass substrate and to enhance the mechanical strength of the sprayed particles to form the anti glare layer.

The manufacturing method of the anti glare layer according to the present invention is to prepare the sprayed particles each having a shell structure and then processing the sprayed particles having the shell structure to form the gaps among the sprayed particles, the light diffraction effect can be reduce or even eliminated to improve the picture quality of the display for promoting the comfort of the user viewing.

As shown in FIG. 2, in this embodiment, the specific preparing method of the spray solution in Step S110 comprises steps of:

Step S101: providing the sprayed particles, which are made of transparent organic resin.

The sprayed particles are the existing sprayed particles. The sprayed particles can be sprayed particles made of organic resin. Specifically, the organic resin can be transparent or colorless organic resin. The transparent or colorless organic resin can be but not limited to polymethyl methacrylate (PMMA), polyethylene terephthalate (PET) or polycarbonate (PC). The sprayed particles made of the aforesaid transparent or colorless organic resin have good light transmittance or good mechanical properties.

In general, the thickness of the sprayed particles used is in a range of 50 μm to 100 μm, such as 50 μm, 75 μm or 100 μm.

Step S102: mixing the sprayed particles in a poor solvent and sufficiently stirring the same so that the spray particles form a suspension.

The sprayed particles provided as aforementioned is mixed in the poor solvent and is sufficiently stirred so that the sprayed particles form the suspension. The poor solvent refers to a solvent has a weak ability to dissolve polymer solute. In this embodiment, it refers to a solution, of which the solubility for PMMA, PET or PC is not high.

Then, the solvent is sufficiently stirred so that the poor solvent coats the sprayed particles to form the suspension for spraying on the glass substrate. A concentration of sprayed particles in the suspension is higher, which is in a range of 0.1 mg/mL to 0.2 mg/mL, such as 0.1 mg/mL, 0.15 mg/mL or 0.2 mg/mL.

Step S103: adding a powder of metal oxide to the suspension and sufficiently stirring the same so that the metal oxide coats the sprayed particles.

The powder of metal oxide, such as iron oxide ($Fe_2O_3$) or sodium oxide ($Na_2O$), which generally shows a color is added to the suspension to easily distinguish between the sprayed particles and the powder of metal oxide and the suspension is sufficiently stirred again so that the metal oxide coats the sprayed particles.

Step S104: forming the spray solution comprising the sprayed particles, each having the shell structure.

At last, the spray solution comprising the sprayed particles, each having the shell structure can be formed. A thickness range of the shell structure of the sprayed particles can be 0.5 μm to 10 μm, such as 0.5 μm, 5.25 μm or 10 μm. In one specific embodiment of the present invention, the thickness range of the shell structure of the sprayed particles can be 2 μm to 5 μm, such as 2 μm, 3.5 μm or 5 μm. A wavelength range of visible light is in a range of 0.39 μm to 0.78 μm.

The spray solution can be prepared with the aforesaid method to obtain the spray solution comprising sprayed particles, each having a shell structure.

Figure 3:
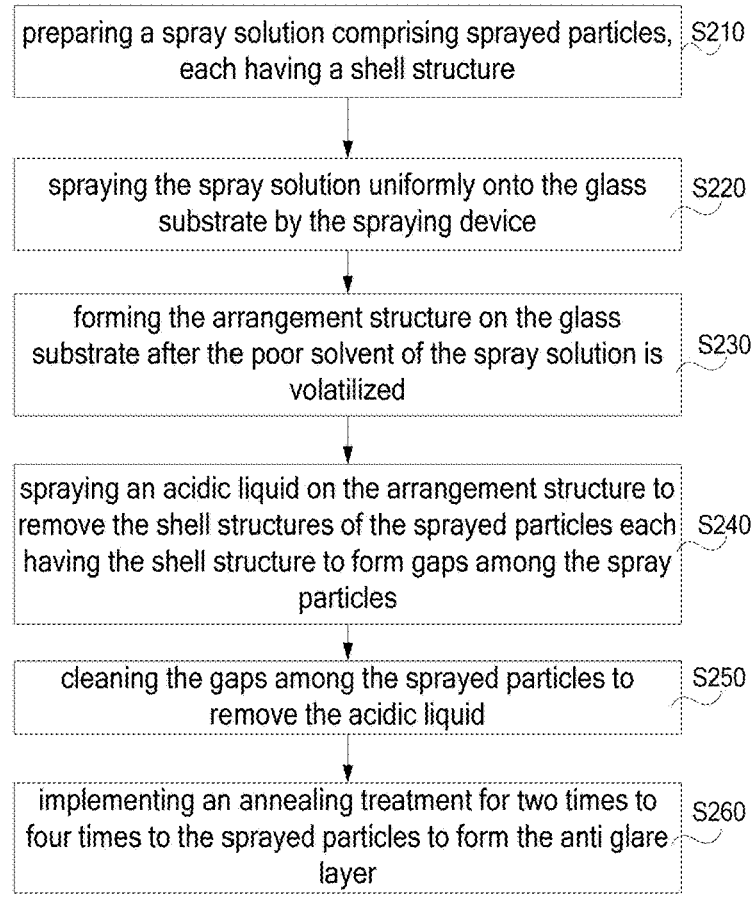
FIG. 3 is a flowchart of another embodiment of the manufacturing method of the anti glare layer according to the present invention.
Figure 4:
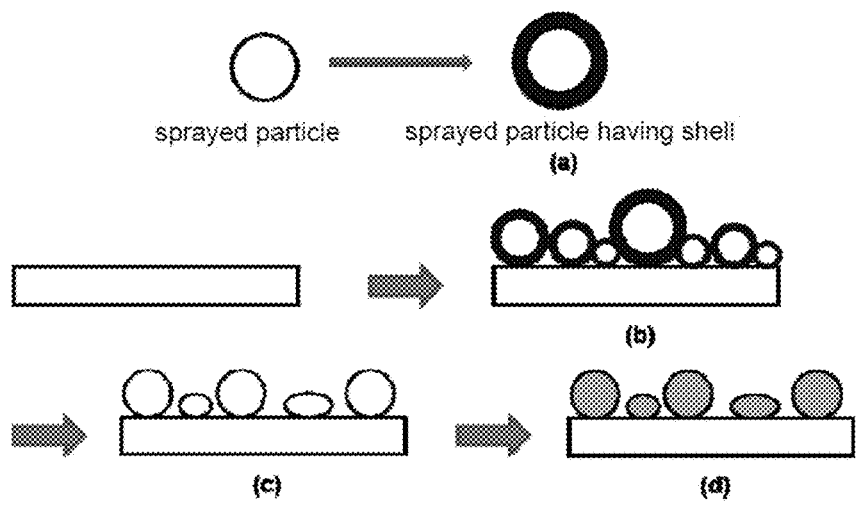
FIG. 4 is a preparation structure diagram of the anti glare layer in one embodiment according to the present invention.

Please refer to FIG. 3 and FIG. 4. FIG. 3 is a flowchart of another embodiment of the manufacturing method of the anti glare layer according to the present invention. FIG. 4 is a preparation structure diagram of the anti glare layer in one embodiment according to the present invention. As shown in FIG. 3, the method comprises steps of:

Step S210, preparing a spray solution comprising sprayed particles, each having a shell structure.

The details of this step are described above and are not mentioned here. The resulting structure is shown in FIG. 4(a).

Step S220: spraying the spray solution uniformly onto the glass substrate by the spraying device.

The prepared spray solution in the aforesaid manufacturing method is filled in the spraying device and pressure or centrifugal force is utilized to spray the spray solution uniformly onto the glass substrate by the spraying device. The thickness range of the spray solution is controlled within 12 μm.

Step S230: forming the arrangement structure on the glass substrate after the poor solvent of the spray solution is volatilized.

Specifically, after the spray solution is uniformly sprayed onto the glass substrate by the spraying device, it is necessary to sufficiently volatilize the poor solvent of the spray solution so as to form the sprayed particles in the arrangement structure on the glass substrate for proceeding the next step.

Due to the high proportion of sprayed particles in the suspension, it is easy to form an arrangement structure that one sprayed particle is next to one spray particle. The resulting structure is shown in FIG. 4(b).

Step S240: spraying an acidic liquid on the arrangement structure to remove the shell structures of the sprayed particles each having the shell structure to form gaps among the spray particles. It is also an option to form holes among the sprayed particles and the present invention is not specifically limited thereto.

The acidic liquid is sprayed on the formed arrangement structure as aforementioned. The acidic liquid reacts with the shell structures, thus removing the shell structures to form the gaps or the holes among the sprayed particles. Since the gap is generated by removing two shell structures, the range of the gap is in a range of 1 μm to 20 μm, such as 1 μm, 10.5 μm or 20 μm. The acidic liquid is an inorganic acidic liquid, including but not limited to hydrochloric acid and dilute sulfuric acid.

Since the wavelength range of visible light is in a range of 0.39 μm to 0.78 μm, the distance of the gaps formed among the sprayed particles in this embodiment can be in a range of 1 μm to 20 μm, which is twice of the thickness range of the shell structure of the sprayed particles and is larger than the maximum wavelength range of visible light, which can greatly reduce or even eliminate the light diffraction effect. The resulting structure is shown in FIG. 4(c).

Step S250: cleaning the gaps among the sprayed particles to remove the acidic liquid.

The gaps among the sprayed particles are cleaned. Specifically the ultrasonic cleaning can be illustrated and the number of cleaning can be two times to three times to remove the acidic liquid.

Step S260: implementing an annealing treatment for two times to four times to the sprayed particles to form the anti glare layer.

At last, annealing treatment is implemented for two times to four times to enhance the binding force between the sprayed particles and the glass substrate and to enhance the mechanical strength of the sprayed particles to form the anti glare layer. The resulting structure of the anti glare layer is shown in FIG. 4(d).

Figure 5:
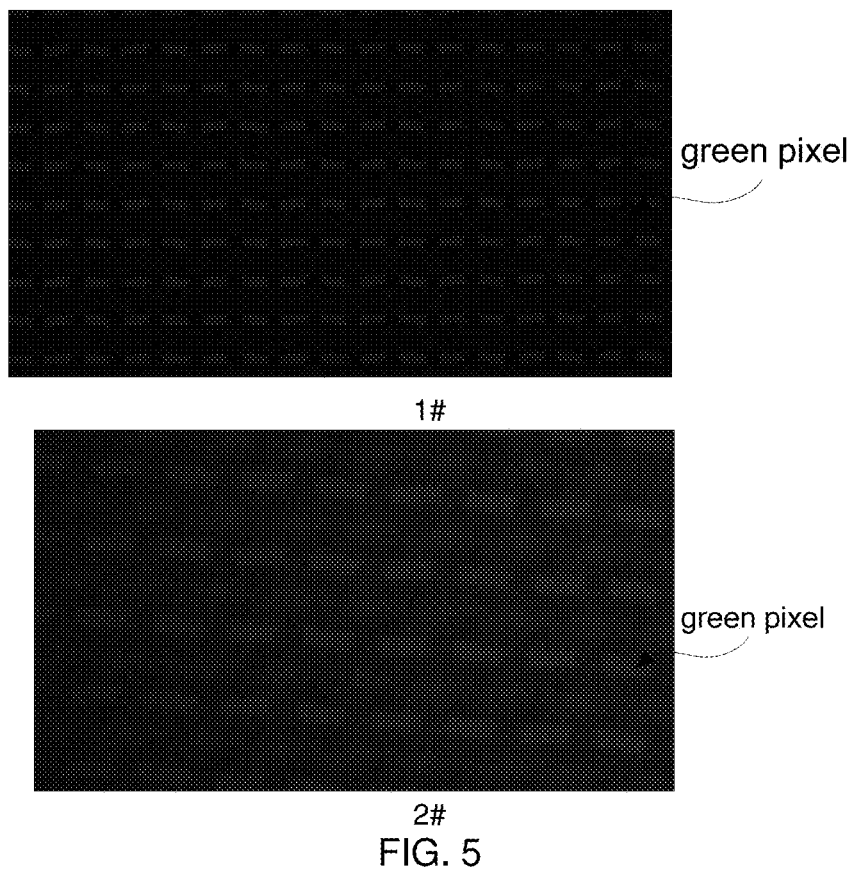
FIG. 5 is a diagram showing the actual measurement results of two anti glare sprayed particle cover sheets having different gaps according to the invention.
Figure 6:
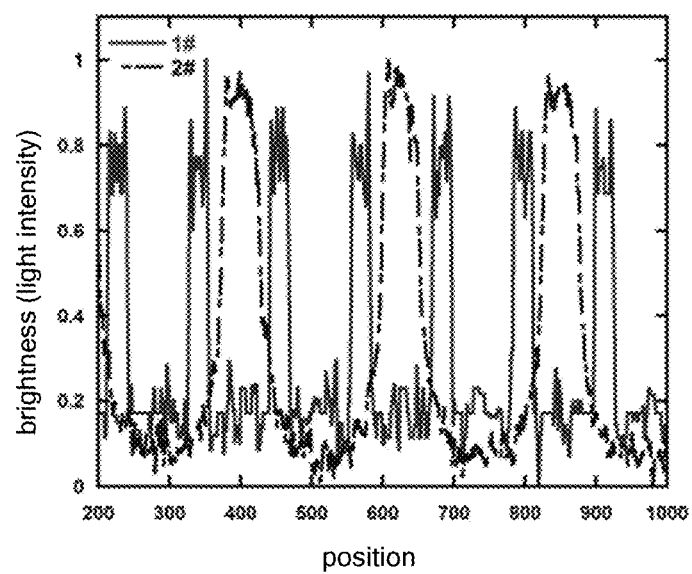
FIG. 6 is a relationship diagram that axis brightness (light intensity) changes with positions in FIG. 5.

Please refer to FIG. 5 and FIG. 6, together. FIG. 5 is a diagram showing the actual measurement results of two anti glare sprayed particle cover sheets having different gaps according to the invention. FIG. 6 is a relationship diagram that axis brightness (light intensity) changes with positions in FIG. 5. The anti glare sprayed particles indicated by 1# in FIG. 5 exceeded the wavelength of the visible light band and the light diffraction is weaker; the gaps of the anti glare sprayed particles indicated by 2# are smaller and equivalent to the wavelength of the visible light, thus the light diffraction is more obvious. As shown in figures, as showing a green screen, the dark states of the red pixel and the blue pixel around the green pixel in 1# are better and the dark states of the red pixel and the blue pixel around the green pixel in 2# are brighter due to the influence of the light diffraction, thus affecting the clarity and sharpness of the screen. In FIG. 1# and FIG. 2#, indicated by the arrow is the position of the green pixel. The red pixel and the blue pixel are respectively located at the upper side and the lower side.

In FIG. 6, the line 1# shows that each bright and dark cycle half width is narrower and the bright and dark conversion at the pixel edge is obvious, it means that the clarity of the screen is higher as showing the screen with the anti glare cover sheet of the line 1#. The line 2# shows that each bright and dark cycle half width is wider and the bright and dark conversion at the pixel edge is relatively insignificant, the clarity of the screen is worse as showing the screen with the anti glare cover sheet of the line 2# and the brightness is relatively lower.

The manufacturing method of the anti glare layer according to the present invention is to prepare the sprayed particles each having a shell structure and then processing the sprayed particles having the shell structure to form the range controllable gaps among the sprayed particles, the light diffraction effect can be reduce or even eliminated to improve the picture quality of the display for promoting the comfort of the user viewing.

Figure 7:
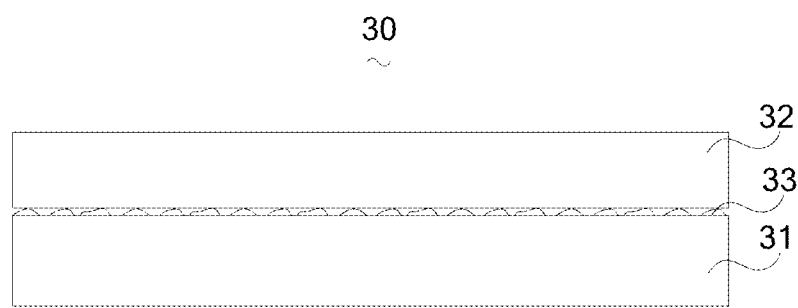
FIG. 7 is a structure diagram of one embodiment according to the display panel of the present invention.

Please refer to FIG. 7. FIG. 7 is a structure diagram of one embodiment according to the display panel of the present invention.

As shown in FIG. 7, the display panel 30 comprises a glass substrate 31 and a display device 32. An anti glare layer 33 is manufactured on the glass substrate 31. The manufacturing method of the anti glare layer 33 is described above.

The manufacturing method of the anti glare layer 33 is described above and are not mentioned here.

In conclusion, those skilled in the art can easily understand that in the manufacturing method of the anti glare layer and the display panel by the present invention, by preparing the sprayed particles each having a shell structure and then processing the sprayed particles having the shell structure to form the gaps among the sprayed particles, the light diffraction effect can be reduce or even eliminated to improve the picture quality of the display for promoting the comfort of the user viewing.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacturing method of an anti glare layer, comprises steps of:
   preparing a spray solution comprising transparent organic resin particles, each having a metal-oxide shell structure;
   spraying the spray solution uniformly onto the glass substrate by a spraying device to form an arrangement structure on the glass substrate;
   spraying an acidic liquid on the arrangement structure to remove the metal-oxide shell structures of the particles each having the metal-oxide shell structure to form gaps among the particles;
   implementing an annealing treatment to the particles to form the anti glare layer.

2. The manufacturing method according to claim 1, wherein the step of preparing the spray solution comprising the transparent organic resin particles, each having the metal-oxide shell structure comprises steps of:
   providing the particles which are made of transparent organic resin;
   mixing the particles in a poor solvent and sufficiently stirring the same so that the particles form a suspension;
   adding a powder of metal oxide to the suspension and sufficiently stirring the same so that the metal oxide coats the particles;
   forming the spray solution comprising the particles, each having the metal-oxide shell structure.

3. The manufacturing method according to claim 2, wherein the step of spraying the spray solution uniformly onto the glass substrate by the spraying device to form the arrangement structure on the glass substrate comprises steps of:
   spraying the spray solution uniformly onto the glass substrate by the spraying device;

forming the arrangement structure on the glass substrate after the poor solvent of the spray solution is volatilized.

4. The manufacturing method according to claim 2, wherein the transparent organic resin is polymethyl methacrylate, polyethylene terephthalate or polycarbonate.

5. The manufacturing method according to claim 1, wherein a thickness of the metal-oxide shell structure is in a range of 0.5 µm to 10 µm.

6. The manufacturing method according to claim 1, wherein before the step of implementing the annealing treatment to the particles to form the anti glare layer, the method further comprises a step of:
cleaning the gaps among the particles to remove the acidic liquid.

7. The manufacturing method according to claim 1, wherein the step of implementing the annealing treatment to the particles to form the anti glare layer comprises a step of:
implementing an annealing treatment for two times to four times to the particles to form the anti glare layer.

8. The manufacturing method according to claim 1, wherein the acidic liquid is an inorganic acidic liquid.

9. The manufacturing method according to claim 1, wherein the gaps are in a range of 1 µm to 20 µm.

10. A manufacturing method of an anti glare layer, comprises steps of:
preparing a spray solution comprising transparent organic resin particles, each having a metal-oxide shell structure;
spraying the spray solution uniformly onto the glass substrate by a spraying device to form an arrangement structure on the glass substrate;
spraying an acidic liquid on the arrangement structure to remove the metal-oxide shell structures of the particles each having the metal-oxide shell structure to form gaps among the particles, wherein the acidic liquid is an inorganic acidic liquid and the gaps are in a range of 1 µm to 20 µm;
implementing an annealing treatment to the particles to form the anti glare layer.

11. The manufacturing method according to claim 10, wherein the step of preparing the spray solution comprising the transparent organic resin particles, each having the metal-oxide shell structure comprises steps of:
providing the particles which are made of transparent organic resin;
mixing the particles in a poor solvent and sufficiently stirring the same so that the particles form a suspension;
adding a powder of metal oxide to the suspension and sufficiently stirring the same so that the metal oxide coats the particles;
forming the spray solution comprising the particles, each having the metal-oxide shell structure.

12. The manufacturing method according to claim 11, wherein the step of spraying the spray solution uniformly onto the glass substrate by the spraying device to form the arrangement structure on the glass substrate comprises steps of:
spraying the spray solution uniformly onto the glass substrate by the spraying device;
forming the arrangement structure on the glass substrate after the poor solvent of the spray solution is volatilized.

13. The manufacturing method according to claim 11, wherein the transparent organic resin is polymethyl methacrylate, polyethylene terephthalate or polycarbonate.

14. The manufacturing method according to claim 10, wherein a thickness of the metal-oxide shell structure is in a range of 0.5 µm to 10 µm.

15. The manufacturing method according to claim 10, wherein before the step of implementing the annealing treatment to the particles to form the anti glare layer, the method further comprises a step of:
cleaning the gaps among the particles to remove the acidic liquid.

16. The manufacturing method according to claim 10, wherein the step of implementing the annealing treatment to the particles to form the anti glare layer comprises a step of:
implementing an annealing treatment for two times to four times to the particles to form the anti glare layer.

\* \* \* \* \*